(12) United States Patent
Goodman et al.

(10) Patent No.: US 7,053,820 B2
(45) Date of Patent: May 30, 2006

(54) GENERATING THREE-DIMENSIONAL IMAGES USING IMPULSIVE RADIO FREQUENCY SIGNALS

(75) Inventors: Vernon R. Goodman, Rockwall, TX (US); David M. Shifrin, Richardson, TX (US); Timothy R. Holzheimer, Rockwall, TX (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 10/840,014

(22) Filed: May 5, 2004

(65) Prior Publication Data

US 2005/0248482 A1 Nov. 10, 2005

(51) Int. Cl.
*G01S 13/89* (2006.01)

(52) U.S. Cl. ............ 342/179; 342/22; 342/25 R; 342/118; 342/134; 342/175; 342/176; 342/180; 342/195; 342/196

(58) Field of Classification Search .......... 342/21, 342/22, 25 R–25 F, 27, 28, 59, 175–181, 342/188–197, 52–58, 118, 134–144; 367/7–11, 367/14, 37, 68–73, 87–117
See application file for complete search history.

(56) References Cited

U.S. PATENT DOCUMENTS

| | | | | |
|---|---|---|---|---|
| 3,719,922 A * | 3/1973 | Lopes et al. | ............... | 367/11 |
| 3,772,697 A | 11/1973 | Ross | | |
| 3,952,299 A * | 4/1976 | Hodge et al. | ............... | 342/189 |
| 4,132,989 A * | 1/1979 | Frosch et al. | ............... | 342/25 R |
| 4,851,848 A * | 7/1989 | Wehner | ............... | 342/25 R |
| 5,280,287 A * | 1/1994 | Evans | ............... | 342/55 |
| 5,512,834 A | 4/1996 | McEwan | ............... | 324/642 |
| 5,543,799 A | 8/1996 | Heger | ............... | 342/85 |
| 5,673,050 A | 9/1997 | Moussally et al. | ............... | 342/22 |
| 5,774,089 A * | 6/1998 | Bamler et al. | ............... | 342/25 R |
| 6,094,157 A * | 7/2000 | Cowdrick | ............... | 342/22 |
| 6,218,938 B1 | 4/2001 | Lin | ............... | 342/149 |
| 6,356,241 B1 | 3/2002 | Jaeger et al. | ............... | 343/789 |
| 6,529,568 B1 | 3/2003 | Richards et al. | | |
| 6,573,857 B1 | 6/2003 | Fullerton et al. | ............... | 342/28 |
| 6,608,585 B1* | 8/2003 | Benitz | ............... | 342/25 R |
| 6,710,736 B1 | 3/2004 | Fullerton et al. | ............... | 342/28 |

OTHER PUBLICATIONS

Tsai, Chen S., "*Integrated Acoustooptic and Magnetooptic Devices for Optical Information Processing*", Proceedings of the IEEE, vol. 84, No. 6, Jun. 1996, pp. 853–869.

(Continued)

*Primary Examiner*—Bernarr E. Gregory
(74) *Attorney, Agent, or Firm*—Baker Botts L.L.P.

(57) ABSTRACT

Generating an image matrix includes accessing a round-trip time matrix for a space having points. The round-trip time matrix describes an estimated round-trip time for a signal to travel from a transmit antenna, to a point, and to a receive antenna. Signals reflected from an object of the space are received at the receive antennas. The following are repeated for at least a subset of the points to generate an image matrix: select a point of the subset of points; for each receive antenna, establish a waveform of a signal received by a receive antenna and identify a waveform value of the established waveform that corresponds to the selected point according to the round-trip time matrix; and combine the waveform values for the selected point to yield an image value for the selected point. The image matrix is generated from the image values.

32 Claims, 3 Drawing Sheets

OTHER PUBLICATIONS

Fontana, Robert J., et al., "*Ultra-Wideband Precision Asset Location System*", To be published in Proceedings IEEE Conference on Ultra Wideband Systems and Technologies, Baltimore, MD, May 2002, 5 pages.

Fontana, Robert, "*Current Trends in UWB Systems in the USA, Implementation, Applications and Regulatory Issues*", Advanced Radio Technology Symposium 2002, Tokyo, Japan, Multispectral Solutions, Inc., 29 pages, Dec. 9, 2002.

Fontana, Robert J., et al., "Commercialization of an Ultra Wideband Precision Asset Location System", Reprinted from 2003 IEEE Conference on Ultra Wideband Systems and Technologies, Nov. 2003, Reston, VA, 6 pages.

Time Domain, The Pulse of the Future, Developer of Ultra Wideband, Products & Eng. Services, Radarvision—Description, http://www.timedomain.com/products/ProdRVn.htm, © 2004 Time Domain Corporation, 2 pages, Printed Mar. 5, 2004.

PCT, Notification of Transmital of the International Search Report and The Written Opinion of the International Searching Authority, or the Declaration, dated Sep. 27, 2005 for International Application No. PCT/US2005/016217, 12 pages.

* cited by examiner

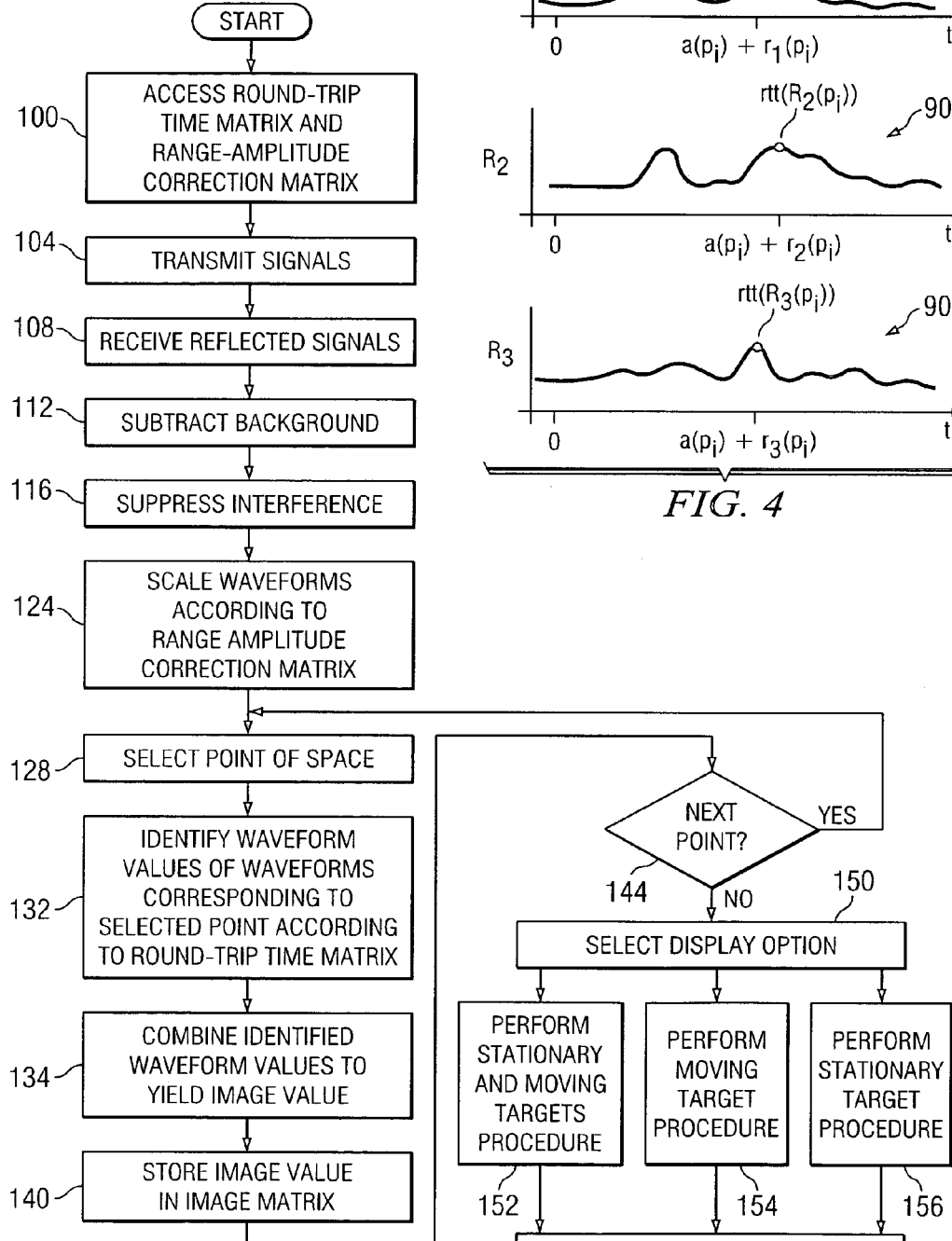

GENERATING THREE-DIMENSIONAL IMAGES USING IMPULSIVE RADIO FREQUENCY SIGNALS

TECHNICAL FIELD

This invention relates generally to the field of imaging systems and more specifically to generating three-dimensional images using impulsive radio frequency signals.

BACKGROUND OF THE INVENTION

Radar imaging devices may be used to detect an object behind an obstruction such as a wall and to generate an image of the object. Some known radar imaging devices, however, are not able to display certain types of images such as three-dimensional images. Moreover, other known radar imaging may not be able to detect certain targets such as stationary targets. It is generally desirable to display certain images and to detect certain targets.

BRIEF SUMMARY OF THE INVENTION

In accordance with the present invention, disadvantages and problems associated with previous techniques for generating images may be reduced or eliminated.

According to one embodiment of the present invention, generating an image matrix includes accessing a round-trip time matrix for a space having discrete points. The round-trip time matrix describes an estimated round-trip time for a signal to travel from a transmit antenna, to a point, and to a receive antenna. Signals reflected from an object of the space are received, where each signal is received at a corresponding receive antenna. The following are repeated for at least a subset of the points to generate an image matrix: select a point of the subset of points; for each receive antenna, establish a waveform of a signal received by a receive antenna and identify a waveform value of the established waveform that corresponds to the selected point according to the round-trip time matrix; and combine the waveform values for the selected point to yield an image value for the selected point. The image matrix is generated from the image values.

Certain embodiments of the invention may provide one or more technical advantages. A technical advantage of one embodiment may be that round-trip times may be used to generate a three-dimensional image. Another technical advantage of one embodiment may be that stationary targets may be detected.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which:

FIG. 3 is a flowchart illustrating one embodiment of a method for generating an image that may be used with the imaging system of FIG. 1; and FIG. 4 illustrates example waveforms of received signals.

DETAILED DESCRIPTION OF THE INVENTION

Embodiments of the present invention and its advantages are best understood by referring to FIGS. 1 through 4 of the drawings, like numerals being used for like and corresponding parts of the various drawings.

Figure 1:
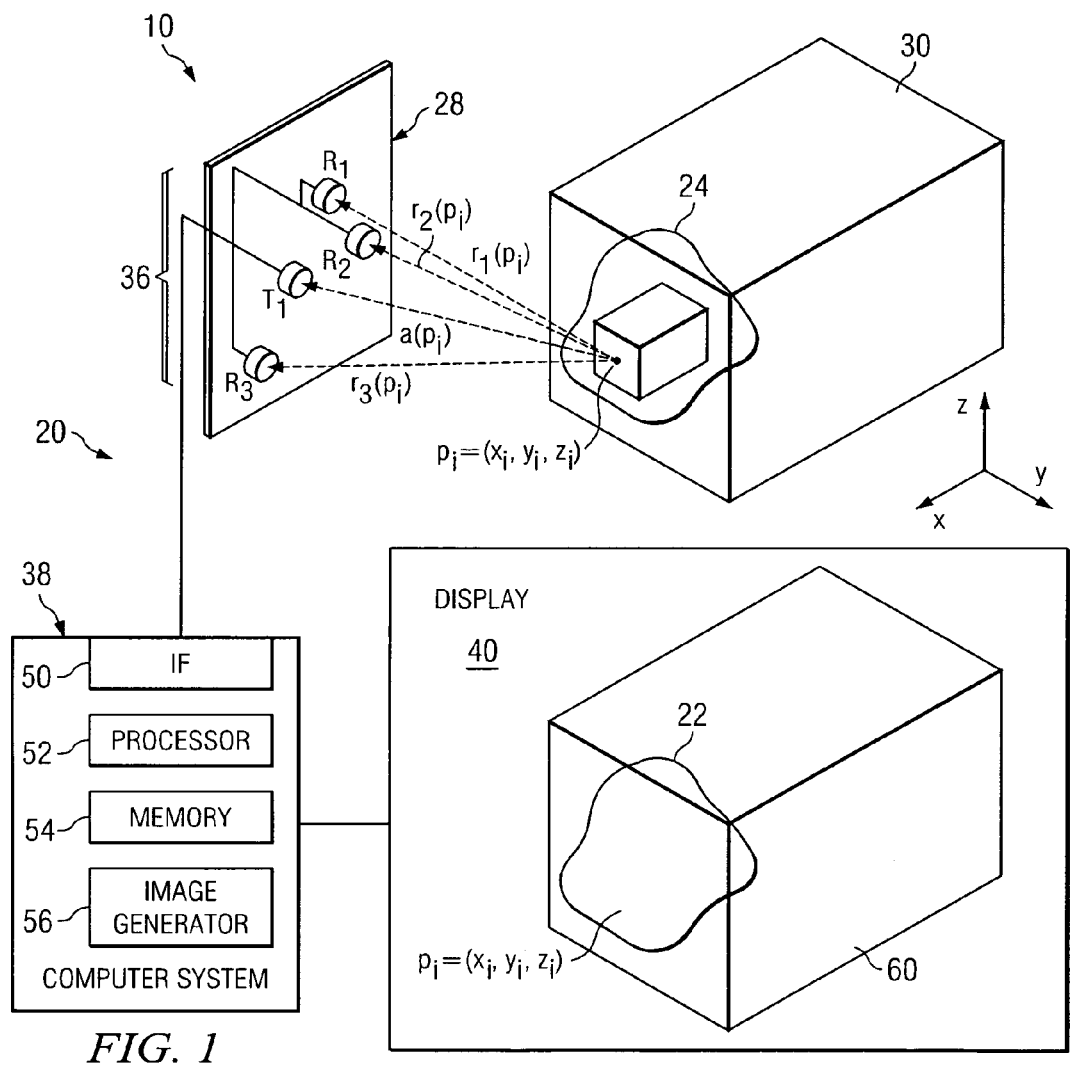
FIG. 1 is a diagram illustrating an environment that includes one embodiment of an imaging system that generates an image of an object that may be located behind an obstruction.

FIG. 1 is a diagram illustrating an environment 10 that includes an imaging system 20 that generates a three-dimensional image 22 of an object 24 that may be located behind an obstruction 28. In general, imaging system 20 transmits signals such as radio frequency signals through an obstruction 28 towards object 24. Imaging system 20 detects signals reflected from object 24 and generates image 22 of object 24 in accordance to the round-trip times of the signals.

Object 24 may comprise any suitable object of any suitable shape or size that can reflect signals such as radio frequency (RF) signals. Object 24 may comprise any suitable material such as a metallic, non-metallic, or a composition of both metallic and non-metallic material. Examples of object 24 include a living organism such as a human, a machine such as a weapon, other suitable object, or any combination of the preceding.

According to the illustrated embodiment, object 24 is located within an actual space 30. Actual space 30 refers to a plurality of points $p_i$ mapped to a physical region in order to represent the physical region. In the illustrated example, actual space 30 has three dimensions to represent a three-dimensional physical region, but actual space 30 may have two dimensions to represent a two-dimensional physical region. In the illustrated embodiment, a point $p_i$ of actual space 30 is expressed as $p_i=(x_i, y_i, z_i)$, and is used to represent a generally cubic region about point $p_i$.

Obstruction 28 may comprise any suitable material that passes through at least some signals that impinge on its surface. Examples of obstruction 28 may include a wall, ground matter, clothing, or any combination of the preceding.

Imaging system 20 generates image 22 of object 24. According to the illustrated embodiment, imaging system 20 includes an antenna system 36, a computing system 38, and a display 40. In general, antenna system 36 transmits signals such as radio frequency signals through obstruction 28 towards object 24. Antenna system 36 detects signals reflected from object 24 and sends the reflected signals to computing system 38. Computing system generates an image matrix, which is used to form image 22 of object 24 on display 40.

According to one embodiment, antenna system 36 has one or more transmit antennas $T_j$, $j=1, \ldots, J$, for transmitting signals and one or more receive antennas $R_k$, $k=1, \ldots, K$, for receiving signals. Antenna system 36 may have, for example, more receive antennas $R_k$ than transmit antennas $T_j$ such as multiple receive antennas $R_k$ and one transmit antenna $T_j$. According to the illustrated embodiment, antenna system 36 has one transmit antenna $T_1$ and three receive antennas $R_1$, $R_2$, and $R_3$.

An antenna of antenna system 36 may comprise, for example, a coaxial antenna such as an embodiment of a coaxial cavity antenna disclosed in U.S. Pat. No. 6,356,241, which is herein incorporated by reference. Coaxial cavity antennas may reduce coupling between the receive antennas $R_k$, which may provide higher-fidelity image reconstruction. The antennas of antenna system 36 may be arranged in any suitable configuration such as a planar configuration that may allow for placement of the antennas proximate to a flat obstruction 28.

Antenna system 36 may operate in an active mode or in a passive mode. In an active mode, antenna system 36 emits a signal that is reflected from object 24 back to antenna system 36. In a passive mode, antenna system 36 does not emit signals but only receives signals reflected from object 24. The passive mode may be used for direction finding purposes.

The signals may comprise ultra-wideband radio frequency signals that have impulse-like waveforms of extremely short duration relative to typical continuous wave radar waveforms. The signals may have pulses of one to three nanoseconds. Ultra-wide band is defined to have a relative bandwidth of at least twenty-five percent. For example, if a waveform has a center frequency of one gigaHertz, the bandwidth is at least two hundred fifty megahertz. The signals may be emitted at high power with a low pulse repetition rate or at a low power with high pulse repetition rate.

The antennas may polarize the signals at diverse orientations. The signals may be vertically or horizontally polarized to detect vertical or horizontal objects, respectively. The signals may be multiply polarized to detect objects that reflect signals at diverse orientations or to reduce multi-path effects.

Computing system 38 processes waveforms of signals received by antenna system 36 to generate image 22, and may operate according to the method described with reference to FIG. 3. According to the illustrated embodiment, computing system 38 includes an interface (IF) 50, a processor 52, a memory 54, and an image generator 56 coupled as shown in FIG. 1. Interface 50 receives and sends data. As used in this document, the term "interface" refers to any suitable structure of a device operable to receive input for the device, send output from the device, or both, and may comprise one or more ports.

Processor 52 manages the operation of computing system 38, and may comprise any suitable hardware, software, other logic, or any combination of the preceding. As used in this document, the term "processor" refers to any suitable device operable to execute instructions and manipulate data to perform operations. Examples of processors include a digital signal processor and a field programmable gate array.

Memory 54 stores and facilitates retrieval of information used by processor 52. As used in this document, the term "memory" refers to any structure operable to store and facilitate retrieval of information used by a processor, and may comprise Random Access Memory (RAM), Read Only Memory (ROM), magnetic drives, disk drives, Compact Disk (CD) Drives, Digital Video Disk (DVD) drives, removable media storage, any other suitable data storage device, or a combination of any of the preceding.

Image generator 56 generates an image matrix for image 22 of object 24 in accordance with the round-trip times of the signals. A round-trip time $rtt_{jk}(p_i)$ refers to the time it takes for a signal to travel from a transmit antenna $T_j$ to a point $p_i$ of actual space 30 and back to a receive antenna $R_k$. The transmit time $a_j(p_i)$ refers to the time it takes for a signal to travel from transmit antenna $T_j$ to point $p_i$, and the receive time $r_k(p_i)$ refers to the time it takes for a signal to travel from point $p_i$ back to receiver antenna $R_k$. Accordingly, the round-trip time $rtt_{jk}(p_i)$ for a signal to travel from transmit antenna $T_j$ to point $p_i$ and return to receive antenna $R_k$ is equal to $a_j(p_i)+r_k(p_i)$. If there is only one transmit antenna $T_j$, the transmit time may be written as $a(p_i)$, and the round-trip time $rtt_{jk}(p_i)$ is $a(p_i)+r_k(p_i)$.

A round-trip time matrix refers to a matrix that records round-trip times $rtt_{jk}(p_i)$. An entry $RTT(p_i)$ of a round-trip time matrix may record the round-trip times for each transmit antenna $T_j$ and each receive antenna $R_k$ of antenna system 36 for a point $p_i$. If there is only one transmit antenna $T_j$, an entry $RTT(p_i)$ may record the round-trip times for each receive antenna $R_k$, k=1, . . . ,K, of antenna system 36 for a point $p_i$. For example, an entry $RTT(p_i)$ may be written as a K-tuple $<rtt_1(p_i), \ldots ,rtt_K(p_i)>$.

The round-trip times may be used to generate an image matrix for image 22. An image matrix refers to a matrix that includes an image value for at least some points $p_i$ of virtual space 60. An image value refers to one more values for one or more parameters used to generate image 22. The parameters may include, for example, intensity, instantaneous frequency, polarization, other parameter, or any combination of the preceding. An image matrix may be generated for a particular time period such as a time period of from a few microseconds to several seconds. Image matrices for successive time periods may be used to display successive images 22 of object 24.

The image values may determined from waveform values of the waveforms. A waveform value may refer to an amplitude or other suitable value of a waveform. The image value for a point $p_i$ may determined from waveform values corresponding to point $p_i$ according to the round-trip time $rtt(p_i)$ of point $p_i$. For example, if a waveform is transmitted at time t=to, then the waveform value at time $t=t_0+rtt(p_i)$ corresponds to point $p_i$. If there is more than one waveform for a point $p_i$, the waveform values of the waveforms may be combined to determine an image value for point $p_i$. The waveform values may be combined by, for example, multiplying or adding them together to yield an image value for point $p_i$.

Computing system 38 may perform other operations that may, for example, improve signal-to-noise (SNR) ratio. As a first example, computing system 38 may scale the waveforms to compensate for differences in waveform amplitude due to the different round-trip times of the signals. According to one embodiment, computing system 38 may scale the waveforms according to a range-amplitude correction matrix. A range-amplitude correction matrix includes range-amplitude correction values for the waveform points of a waveform. A range-amplitude correction value refers to a value that is used to correct a waveform point to compensate for the differences in waveform amplitude. For example, the amplitude value of a waveform point may be multiplied by a range-amplitude correction value to correct the amplitude. A range-amplitude correction value $rac_{jk}(p_i)$ may be used to correct a waveform of a signal transmitted from transmit antenna $T_j$ to point $p_i$ and received by receive antenna $R_k$. If there is one transmit antenna, the range-amplitude correction value may be written as $rac_k(p_i)$.

As another example, image generator 56 may reduce or subtract a background from the waveforms to reduce or remove transmitter-receiver coupling. Background may represent an empty actual space 30 such as a space that does not include objects or that does not include targeted objects. Background measurements may be subtracted from received waveforms to reduce or subtract the background. Background measurements refer to measurements made of only the background, which may be made during an initial calibration of imaging system 20 and may be updated by periodic calibration of imaging system 20.

As yet another example, image generator 56 may suppress interference such as narrow band interference. Interference may be suppressed by detecting interfering signals, filtering out the interfering signals, and amplifying the pulses of the signals. According to one embodiment, narrow band interference may be suppressed by converting the waveforms to the frequency domain using a windowed fast Fourier transform. Narrow band peaks may be zeroed out, or removed. The waveforms may then be converted back to the time domain using an inverse fast Fourier transform. As yet another example, image generator 56 may average the waveforms, which may improve the final image. Image generator 56 may average any suitable number of waveforms, such as from 10 to 100 waveforms.

As yet another example, image generator 56 may generate image matrices that display both stationary and moving targets, only stationary targets, or only moving targets. Stationary and moving targets may be displayed by generating successive images 22 from successive image matrices. Stationary targets may be displayed by averaging together any suitable number of image matrices, for example, from 5 to 100 images, or by utilizing an alpha filter such as a low pass filter with an alpha value greater than 0.9. The resulting image matrix may then be used to generate image 22.

Moving targets may be identified by calculating the differences between image matrices of successive time periods. Images 22 that have different positions in successive image matrices may be identified as moving. The difference in position may be required to satisfy a threshold value to be considered moving. The images 22 of the moving targets may be displayed.

Interface 50, processor 52, memory 54, and image generator 56 may be integrated or separated according to particular needs. For example, the present invention contemplates the functions of both processor 52 and memory 54 being provided using a single device, for example, a computer. If any of interface 50, processor 52, memory 54, or image generator 56 are separated, separate elements may be coupled using a bus or other suitable link.

Display 40 displays image 22 of object 24. Display 40 may comprise, for example, a computer screen, a goggle display, or other suitable display. In the illustrated embodiment, display 40 comprises a two-dimensional screen that is operable to display a three-dimensional image 22. According to the illustrated embodiment, image 22 is presented in a virtual space 60 that corresponds to actual space 30 in which object 24 is located. The points $p_i$ of virtual space 60 correspond to points $p_i$ of actual space 30. Image 22 may be presented in any suitable manner. As an example, image 22 may be rotated in three-dimensional space in order to display a different view of image 22. As another example, image 22 generated from waves of a specific polarization may be displayed.

Imaging system 20 may be deployed in any suitable embodiment. For example, imaging system 20 may be deployed in a smaller format to be carried by a person, or may be deployed in a larger format to map a building compound. An example embodiment is described with reference to FIGS. 2A and 2B.

Alterations or permutations such as modifications, additions, or omissions may be made to imaging system 20 without departing from the scope of the invention. Imaging system 20 may have more, fewer, or other modules. For example, the operations of image generator 56 may be performed by more than one module. Additionally, operations of imaging system 20 may be performed using any suitable logic comprising software, hardware, other logic, or any suitable combination of the preceding. As used in this document, "each" refers to each member of a set or each member of a subset of a set.

Figure 2A:
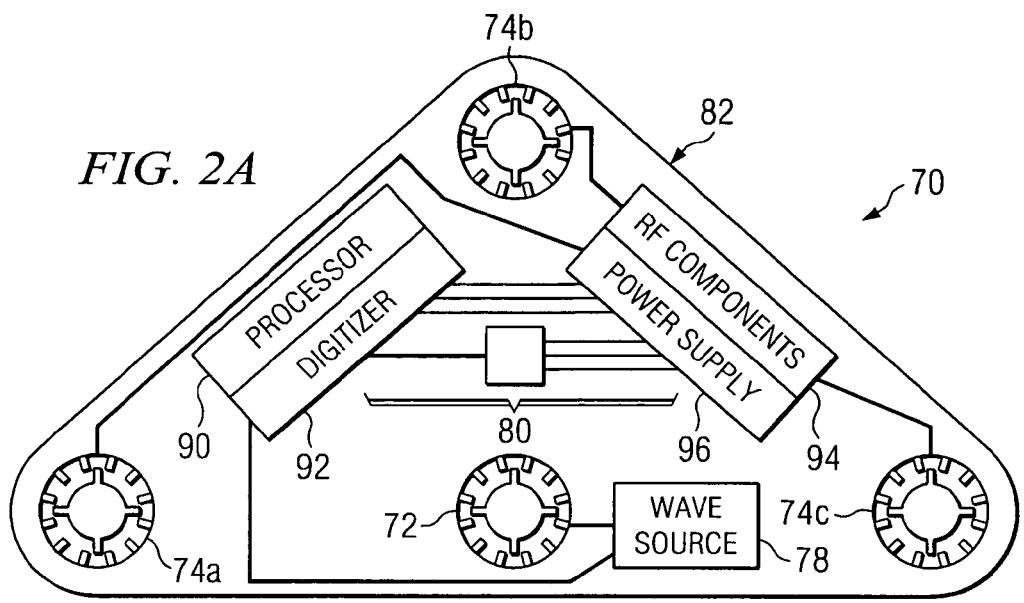
FIGS. 2A and 2B illustrate an example imaging system.
Figure 2B:
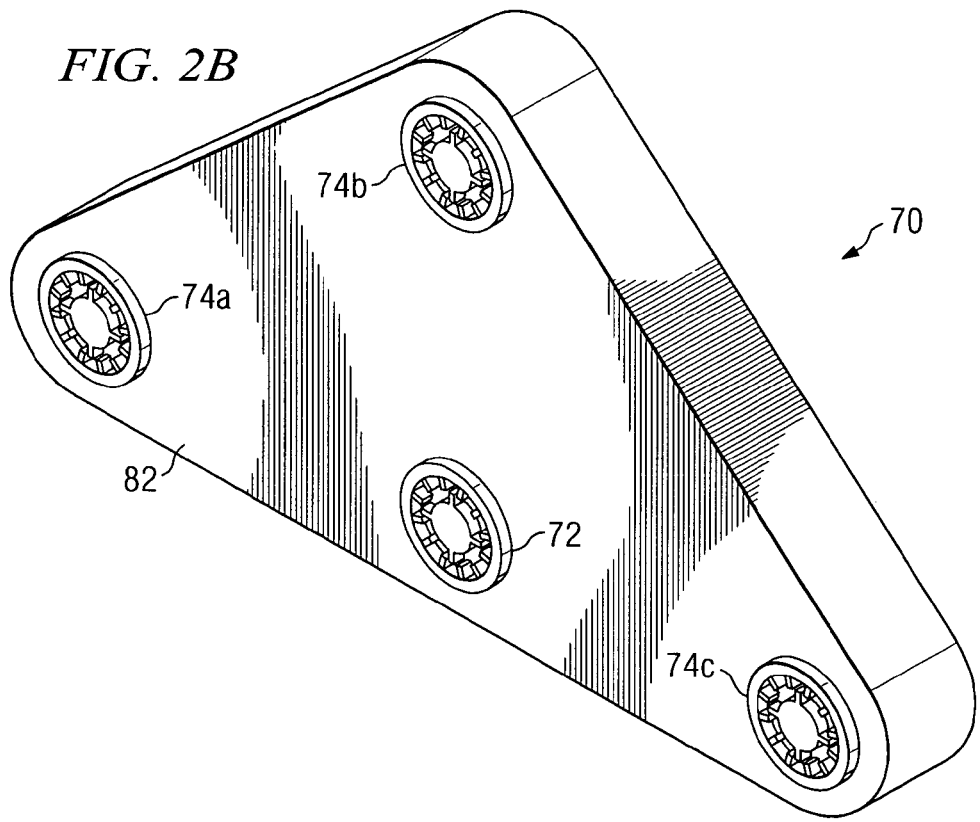

FIGS. 2A and 2B illustrate an example imaging system 70. FIG. 2A illustrates a side of device 70 through which signals are emitted and received. System 70 includes a transmit antenna 72, receive antennas 74, a wave source 78, a computing system 80, and a housing 82 coupled as shown.

Wave source 78 may generate signals such as ultrawideband radio frequency signals. Wave source 78 may include, for example, a seventy picosecond rise-time, nine to thirty volt ultra-wideband source. Transmit antenna 72 transmits signals, which are reflected from object 22, and received by receive antennas 74. Transmit antenna 72 and receive antenna 74 may comprise, for example, a coaxial antenna.

Computing system 80 operates to generate image 22 from the reflected signals, and may operate according to the method described with reference to FIG. 3. According to the illustrated embodiment, computing system 80 includes a processor 90, a digitizer 92, radio frequency components 94, and a power distributor 96 coupled as shown. Digitizer 92 may comprise a multi-channel digitizer to capture the waveforms from each antenna. Radio frequency components 96 may comprise multi-stage low-noise ultra-wideband radio frequency amplifiers. Housing 82 serves to hold the components of system 70. Housing is described in more detail with reference to FIG. 2B.

FIG. 2B illustrates a perspective view of system 70. Housing 82 may comprise any suitable material that can hold the components of system 70. For example, housing 82 may comprise fiberglass. Portions of housing 82 through which signals are transmitted and received may expose the transmit and receive antennas to allow the antennas to transmit and receive signals, respectively. Alternatively or additionally, housing 82 may cover antennas with a material through which the signals may pass.

Alterations or permutations such as modifications, additions, or omissions may be made to imaging system 70 without departing from the scope of the invention. Imaging system 70 may have more, fewer, or other modules. Additionally, operations of imaging system 70 may be performed using any suitable logic comprising software, hardware, other logic, or any suitable combination of the preceding.

FIG. 3 is a flowchart illustrating one embodiment of a method for generating an image that may be used with system 10 of FIG. 1. The method begins at step 100, where a round-trip time matrix and a range-amplitude correction matrix are accessed. A round-trip time matrix refers to a matrix that records the round-trip times $rtt_{jk}(p_i)$ takes for a signal to travel from a transmit antenna $T_j$ to a point $p_i$ of actual space 30 and back to a receive antenna $R_k$. A range-amplitude correction matrix includes range-amplitude correction values for each waveform point of a waveform.

Signals are transmitted at step 104 by transmit antenna $T_j$. The signals pass through obstruction 28 to object 24, and are reflected back towards antenna system 36. Receive antennas $R_k$ receive the reflected signals at step 108. Waveforms representing the signals are sent to computing system 38. Example waveforms are illustrated in FIG. 4.

FIG. 4 illustrates example waveforms 90 received by receive antennas. According to the illustrated embodiment, receive antenna $R_1$ receives waveform 90a, receive antenna $R_2$ receives waveform 90b, and receive antenna $R_3$ receives waveform 90c. Waveforms 90 are presented as examples only, and are not meant to narrow the scope of the invention.

Referring back to FIG. 3, image generator 56 of computing system 38 may subtract the background from the waveforms at step 112. Background measurements may be subtracted from the waveforms to subtract the background. Interference may be suppressed at step 116. Narrow band interference may be suppressed by converting the waveforms to the frequency domain using a windowed fast Fourier transform, removing narrow band peaks, and then converting the waveforms back to the time domain using an inverse fast Fourier transform. The waveforms for each point $p_i$ may be averaged to remove further interference. The waveforms may be scaled according to the range-amplitude correction matrix at step 124. A range-amplitude correction matrix includes range-amplitude correction values used to correct the amplitude of a waveform point to compensate for the differences in range.

A point $p_i$ of space 30 is selected at step 128. The waveform values corresponding to the selected point $p_i$ are identified at step 132 according to the round-trip time matrix. For example, if a waveform is transmitted at time $t=t_0$, then the waveform value at time $t=t_0+rtt(p_i)$ corresponds to point $p_i$. The waveform values are combined at step 134 to yield the image value for the selected point $p_i$. The waveform values may be combined by multiplying the values together.

The image values are stored in an image matrix at step 140. The image matrix may include image values for each point $p_i$ used to generate image 22. If there is a next point $p_i$ of image space 30 at step 144, the method proceeds to step 128 to select the next point $p_i$. If there is no next point $p_i$ at step 144, the method proceeds to step 150.

A display option is selected at step 150. Image 22 may be displayed in any suitable manner. For example, both stationary and moving targets, only stationary targets, or only moving targets may be displayed. If both stationary and moving targets are to be displayed, the method proceeds to step 152 to perform a stationary plus moving targets procedure. Image 22 of stationary and moving targets is generated from successive image matrices.

If only stationary targets are to be displayed, the method proceeds to step 154 to perform a stationary targets procedure. Stationary targets may be displayed by averaging together a suitable number of image matrices and generating image 22 from the averaged image matrix. If only moving targets are to be displayed, the method proceeds to step 154 to perform a moving targets procedure. Moving targets are identified by determining the images 22 that have different positions in successive image matrices. The moving targets may then be displayed. Image 22 is displayed using display 40 at step 160. After displaying image 22, the method terminates.

Alterations or permutations such as modifications, additions, or omissions may be made to the method without departing from the scope of the invention. The method may include more, fewer, or other steps. Additionally, steps may be performed in any suitable order without departing from the scope of the invention.

Certain embodiments of the invention may provide one or more technical advantages. A technical advantage of one embodiment may be that round-trip times may be used to generate a three-dimensional image. Another technical advantage of one embodiment may be that stationary targets may be detected.

While this disclosure has been described in terms of certain embodiments and generally associated methods, alterations and permutations of the embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

To aid the Patent Office and any readers of any patent issued on this application in interpreting the claims appended hereto, applicants wish to note that they do not intend any of the appended claims to invoke paragraph 6 of 35 U.S.C. § 112 as it exists on the date of filing hereof unless the words "means for" or "step for" are used in the particular claim.

What is claimed is:

1. A method for generating an image matrix, comprising:
   accessing a round-trip time matrix for a space comprising a plurality of points, the round-trip time matrix describing an estimated round-trip time for a signal of a plurality of signals to travel from a transmit antenna of one or more transmit antennas, to a point of the plurality of points, and to a receive antenna of one or more receive antennas;
   receiving the plurality of signals reflected from an object of the space, each signal received at a corresponding receive antenna of the one or more receive antennas;
   repeating for at least a subset of the plurality of points to generate an image matrix comprising an image value for each point of the subset of points:
      selecting a point of the subset of points;
      repeating for each receive antenna of the one or more receive antennas:
         establishing a waveform of a signal received by a receive antenna of the one or more receive antennas; and
         identifying a waveform value of the established waveform that corresponds to the selected point according to the round-trip time matrix; and
      combining the waveform values for the selected point to yield an image value for the selected point; and
   generating the image matrix from the image values.

2. The method of claim 1, wherein identifying the waveform value of the established waveform that corresponds to the selected point according to the round-trip time matrix further comprises:
   determining a waveform point of the established waveform that corresponds to the estimated round-trip time corresponding to the selected point and the receive antenna; and
   taking the waveform value of the waveform at the determined waveform point.

3. The method of claim 1, further comprising scaling the waveform values of the waveforms by:
   accessing a range-amplitude correction matrix comprising a plurality of correction values, a correction value corresponding to a waveform point of a waveform; and
   adjusting the waveform values of the waveform points of the waveforms in accordance with the plurality of correction values.

4. The method of claim 1, further comprising reducing a background of the waveforms by:
   determining one or more background measurements for each waveform; and
   subtracting the one or more background measurements from the waveforms.

5. The method of claim 1, further comprising reducing interference by:
- detecting a plurality of interfering signals of the plurality of signals;
- filtering out the interfering signals; and
- amplifying a plurality of pulses of the plurality of signals.

6. The method of claim 1, further comprising generating an averaged image matrix to display a stationary target by:
- generating a plurality of successive image matrices; and
- averaging the image values of the successive image matrices to yield the averaged image matrix to display the stationary target.

7. The method of claim 1, further comprising identifying a moving target by:
- generating a plurality of successive image matrices;
- detecting a difference between two successive image matrices;
- determining a portion of the successive image matrices corresponding to the difference; and
- identifying the portion as the moving target.

8. The method of claim 1, wherein at least one of the one or more transmit antennas and the one or more receive antennas comprises a coaxial cavity antenna.

9. The method of claim 1, further comprising transmitting the plurality of signals from the one or more transmit antennas.

10. The method of claim 1, wherein the plurality of signals comprises one or more polarized signals.

11. A system for generating an image matrix, comprising:
- a memory operable to store a round-trip time matrix for a space comprising a plurality of points, the round-trip time matrix describing an estimated round-trip time for a signal of a plurality of signals to travel from a transmit antenna of one or more transmit antennas, to a point of the plurality of points, and to a receive antenna of one or more receive antennas;
- one or more receive antennas operable to receive the plurality of signals reflected from an object of the space, a receive antenna of the one or more receive antennas being operable to receive a corresponding signal; and
- an image generator operable to:
  - repeat for at least a subset of the plurality of points to generate an image matrix comprising an image value for each point of the subset of points:
    - select a point of the subset of points;
    - repeat for each receive antenna of the one or more receive antennas:
      - establish a waveform of a signal received by a receive antenna of the one or more receive antennas; and
      - identify a waveform value of the established waveform that corresponds to the selected point according to the round-trip time matrix; and
    - combine the waveform values for the selected point to yield an image value for the selected point; and
  - generate the image matrix from the image values.

12. The system of claim 11, the image generator further operable to identify the waveform value of the established waveform that corresponds to the selected point according to the round-trip time matrix by:
- determining a waveform point of the established waveform that corresponds to the estimated round-trip time corresponding to the selected point and the receive antenna; and
- taking the waveform value of the waveform at the determined waveform point.

13. The system of claim 11, the image generator further operable to scale the waveform values of the waveforms by:
- accessing a range-amplitude correction matrix comprising a plurality of correction values, a correction value corresponding to a waveform point of a waveform; and
- adjusting the waveform values of the waveform points of the waveforms in accordance with the plurality of correction values.

14. The system of claim 11, the image generator further operable to reduce a background of the waveforms by:
- determining one or more background measurements for each waveform; and
- subtracting the one or more background measurements from the waveforms.

15. The system of claim 11, the image generator further operable to reduce interference by:
- detecting a plurality of interfering signals of the plurality of signals;
- filtering out the interfering signals; and
- amplifying a plurality of pulses of the plurality of signals.

16. The system of claim 11, the image generator further operable to generate an averaged image matrix to display a stationary target by:
- generating a plurality of successive image matrices; and
- averaging the image values of the successive image matrices to yield the averaged image matrix to display the stationary target.

17. The system of claim 11, the image generator further operable to identify a moving target by:
- generating a plurality of successive image matrices;
- detecting a difference between two successive image matrices;
- determining a portion of the successive image matrices corresponding to the difference; and
- identifying the portion as the moving target.

18. The system of claim 11, wherein at least one of the one or more transmit antennas and the one or more receive antennas comprises a coaxial cavity antenna.

19. The system of claim 11, further comprising the one or more transmit antennas operable to transmit the plurality of signals.

20. The system of claim 11, wherein the plurality of signals comprises one or more polarized signals.

21. Software for generating an image matrix, the software embodied in a computer-readable medium and operable to:
- access a round-trip time matrix for a space comprising a plurality of points, the round-trip time matrix describing an estimated round-trip time for a signal of a plurality of signals to travel from a transmit antenna of one or more transmit antennas, to a point of the plurality of points, and to a receive antenna of one or more receive antennas;
- receive the plurality of signals reflected from an object of the space, each signal received at a corresponding receive antenna of the one or more receive antennas;
- repeat for at least a subset of the plurality of points to generate an image matrix comprising an image value for each point of the subset of points:
  - select a point of the subset of points;
  - repeat for each receive antenna of the one or more receive antennas:
    - establish a waveform of a signal received by a receive antenna of the one or more receive antennas; and
    - identify a waveform value of the established waveform that corresponds to the selected point according to the round-trip time matrix; and combine the waveform values for the selected point to yield an image value for the selected point; and
generate the image matrix from the image values.

22. The software of claim 21, further operable to identify the waveform value of the established waveform that corresponds to the selected point according to the round-trip time matrix by:
determining a waveform point of the established waveform that corresponds to the estimated round-trip time corresponding to the selected point and the receive antenna; and
taking the waveform value of the waveform at the determined waveform point.

23. The software of claim 21, further operable to scale the waveform values of the waveforms by:
accessing a range-amplitude correction matrix comprising a plurality of correction values, a correction value corresponding to a waveform point of a waveform; and
adjusting the waveform values of the waveform points of the waveforms in accordance with the plurality of correction values.

24. The software of claim 21, further operable to reduce a background of the waveforms by:
determining one or more background measurements for each waveform; and
subtracting the one or more background measurements from the waveforms.

25. The software of claim 21, further operable to reduce interference by:
detecting a plurality of interfering signals of the plurality of signals;
filtering out the interfering signals; and
amplifying a plurality of pulses of the plurality of signals.

26. The software of claim 21, further operable to generate an averaged image matrix to display a stationary target by:
generating a plurality of successive image matrices; and
averaging the image values of the successive image matrices to yield the averaged image matrix to display the stationary target.

27. The software of claim 21, further operable to identify a moving target by:
generating a plurality of successive image matrices;
detecting a difference between two successive image matrices;
determining a portion of the successive image matrices corresponding to the difference; and
identifying the portion as the moving target.

28. The software of claim 21, wherein at least one of the one or more transmit antennas and the one or more receive antennas comprises a coaxial cavity antenna.

29. The software of claim 21, further operable to transmit the plurality of signals from the one or more transmit antennas.

30. The software of claim 21, wherein the plurality of signals comprises one or more polarized signals.

31. A system for generating an image matrix, comprising:
means for accessing a round-trip time matrix for a space comprising a plurality of points, the round-trip time matrix describing an estimated round-trip time for a signal of a plurality of signals to travel from a transmit antenna of one or more transmit antennas, to a point of the plurality of points, and to a receive antenna of one or more receive antennas;
means for receiving the plurality of signals reflected from an object of the space, each signal received at a corresponding receive antenna of the one or more receive antennas;
means for repeating for at least a subset of the plurality of points to generate an image matrix comprising an image value for each point of the subset of points:
selecting a point of the subset of points;
repeating for each receive antenna of the one or more receive antennas:
establishing a waveform of a signal received by a receive antenna of the one or more receive antennas; and
identifying a waveform value of the established waveform that corresponds to the selected point according to the round-trip time matrix; and
combining the waveform values for the selected point to yield an image value for the selected point; and
means for generating the image matrix from the image values.

32. A method for generating an image matrix, comprising:
accessing a round-trip time matrix for a space comprising a plurality of points, the round-trip time matrix describing an estimated round-trip time for a signal of a plurality of signals to travel from a transmit antenna of one or more transmit antennas, to a point of the plurality of points, and to a receive antenna of one or more receive antennas, at least one of the one or more transmit antennas and the one or more receive antennas comprising a coaxial cavity antenna, the plurality of signals comprising one or more polarized signals;
receiving the plurality of signals reflected from an object of the space, each signal received at a corresponding receive antenna of the one or more receive antennas;
repeating for at least a subset of the plurality of points to generate an image matrix comprising an image value for each point of the subset of points:
selecting a point of the subset of points;
repeating for each receive antenna of the one or more receive antennas:
establishing a waveform of a signal received by a receive antenna of the one or more receive antennas;
reducing a background of the waveform by determining one or more background measurements for the waveform, and subtracting the one or more background measurements from the waveform;
reducing interference by repeating the following: detecting a plurality of interfering signals of the plurality of signals, filtering out the interfering signals, and amplifying a plurality of pulses of the plurality of signals;
identifying a waveform value of the established waveform that corresponds to the selected point according to the round-trip time matrix by:
determining a waveform point of the established waveform that corresponds to the estimated round-trip time corresponding to the selected point and the receive antenna; and
taking the waveform value of the waveform at the determined waveform point;
scaling the waveform value by accessing a range-amplitude correction matrix comprising a plurality of correction values, a correction value corresponding to a waveform point of the waveform, and adjusting the waveform value in accordance with the plurality of correction values; and
combining the waveform values for the selected point to yield an image value for the selected point; and
generating the image matrix from the image values;

generating an averaged image matrix to display a stationary target by generating a plurality of first successive image matrices, and averaging the image values of the first successive image matrices to yield the averaged image matrix to display the stationary target; and identifying a moving target by generating a plurality of second successive image matrices, detecting a difference between two second successive image matrices, determining a portion of the second successive image matrices corresponding to the difference, and identifying the portion as the moving target.

* * * * *

UNITED STATES PATENT AND TRADEMARK OFFICE
CERTIFICATE OF CORRECTION

PATENT NO. : 7,053,820 B2
APPLICATION NO. : 10/840014
DATED : May 30, 2006
INVENTOR(S) : Vernon R. Goodman et al.

It is certified that error appears in the above-identified patent and that said Letters Patent is hereby corrected as shown below:

<u>Title Page:</u>
Right Column, Line 8, please delete "6,218,938" and insert -- 6,218,983 --.

<u>Column 4, Line 33:</u>
After "time" delete "t=to," and insert -- $t=t_0$ --.

Signed and Sealed this

Twenty-second Day of July, 2008

JON W. DUDAS
*Director of the United States Patent and Trademark Office*